US009127219B2

(12) United States Patent
Mall et al.

(10) Patent No.: US 9,127,219 B2
(45) Date of Patent: Sep. 8, 2015

(54) ADDITIVE SYSTEMS FOR BIOMASS GASIFICATION

(75) Inventors: Omprakash Mall, Bangalore (IN); Richard Anthony De Puy, Burnt Hills, NY (US); Amol Ramesh Mahulkar, Bangalore (IN); Srinivasarao Jallepalli, Thane (IN)

(73) Assignee: General Electric Company, Schenectady, NY (US)

( * ) Notice: Subject to any disclaimer, the term of this patent is extended or adjusted under 35 U.S.C. 154(b) by 909 days.

(21) Appl. No.: 13/186,360

(22) Filed: Jul. 19, 2011

(65) Prior Publication Data
US 2013/0019528 A1 Jan. 24, 2013

(51) Int. Cl.
| | | |
|---|---|---|
| *C10J 3/82* | (2006.01) | |
| *C10J 3/24* | (2006.01) | |
| *C10J 3/26* | (2006.01) | |
| *C10K 1/06* | (2006.01) | |
| *C10K 1/10* | (2006.01) | |
| *C10K 1/02* | (2006.01) | |

(52) U.S. Cl.
CPC ... *C10J 3/26* (2013.01); *C10K 1/06* (2013.01); *C10K 1/101* (2013.01); *C10J 2300/0903* (2013.01); *C10J 2300/0916* (2013.01); *C10J 2300/0956* (2013.01); *C10J 2300/0986* (2013.01); *C10J 2300/165* (2013.01); *C10J 2300/1628* (2013.01); *C10J 2300/1807* (2013.01); *C10K 1/026* (2013.01)

(58) Field of Classification Search
USPC .............. 48/61, 76, 127.1, 127.9, 200–203, 48/71–73
See application file for complete search history.

(56) References Cited

U.S. PATENT DOCUMENTS

| | | | | |
|---|---|---|---|---|
| 4,348,487 | A * | 9/1982 | Goldstein et al. | 518/704 |
| 5,607,487 | A * | 3/1997 | Taylor | 48/111 |
| 7,696,124 | B2 | 4/2010 | Felix et al. | |
| 2002/0159929 | A1 * | 10/2002 | Kaneko et al. | 422/190 |
| 2004/0244289 | A1 * | 12/2004 | Morozumi et al. | 48/77 |

(Continued)

FOREIGN PATENT DOCUMENTS

EP          1 203 802 A1     8/2002

OTHER PUBLICATIONS

Timpe, et al., "A Comparison of Zeolite and Dolomite as Gasification Tar-Cracking Catalysts", 40_4_CHICAGO_08-95_0783.

(Continued)

*Primary Examiner* — Kaity Handal
(74) *Attorney, Agent, or Firm* — Fletcher Yoder, P.C.

(57) ABSTRACT

The present embodiments provide additive systems for biomass gasification reactors. For example, in one embodiment, a biomass gasification system includes a feedstock preparation system configured to generate a biomass feedstock having a biomass fuel and a tar cracking additive. The system also includes a gasifier configured to receive the biomass feedstock and gasify the biomass fuel in the presence of the tar cracking additive to generate first and second mixtures. The first mixture has producer gas and the second mixture has the tar cracking additive and ash. The biomass gasification system further includes an additive recycle system configured to receive the second mixture and to separate at least a portion of the tar cracking additive from the ash to generate a recycled additive feed for the feedstock preparation system.

9 Claims, 3 Drawing Sheets

(56) References Cited

U.S. PATENT DOCUMENTS

| | | | |
|---|---|---|---|
| 2006/0265954 A1* | 11/2006 | Dogru et al. | 48/197 R |
| 2007/0094929 A1 | 5/2007 | Kang et al. | |
| 2010/0305220 A1 | 12/2010 | Kukkonen et al. | |
| 2012/0311991 A1* | 12/2012 | Mall et al. | 60/39.12 |
| 2012/0313378 A1* | 12/2012 | DePuy et al. | 290/1 A |

OTHER PUBLICATIONS

Williams, et al., "Biomass Gasifier Gas Turbine Power Generating Technology", Biomass and Bioenergy, vol. 10, Nos. 2-3, pp. 149-166 (1996).

Myren, et al., "Catalytic Tar Decomposition of Biomass Pyrolysis Gas with a Combination of Dolomite and Silica", Biomass and Bioenergy, vol. 23, Issue 3, pp. 217-227, (May 2002).

Wang, et al., "Novel Catalyst for Cracking of Biomass Tar", Energy & Fuels, vol. 19, Issue 1, pp. 22-27, (Dec. 2004).

Gerber, M.A., "Review of Novel Catalysts for Biomass Tar Cracking and Methane Reforming", Pacific Northwest National Laboratory, PNNL-16950, Oct. 2007.

Torres, et al., "Hot Gas Removal of Tars, Ammonia, and Hydrogen Sulfide from Biomass Gasification Gas", Catalysis Reviews, vol. 49, pp. 407-456 (Oct. 1, 2007).

Shivakumar, et al., "Inventory of Existing Technologies on Biomass Gasification", Karnataka State Counsel for Science and Technology, submitted to Department of Scientific and Industrial Research Government of India, New Delhi (2008).

Skala, et al., "Research into Biomass and Waste Gasification in Atmospheric Fluidized Bed", Program of the WSEAS Conferences, Jul. 1-3, 2009.

Anawat Ketcong, et al., "The Development of Ni/Dolomite Catalyst in Simultaneous Biomass Gasification and Reforming in Fluidized Bed", American Journal of Environmental Sciences, vol. 5, Issue 3, pp. 273-277 (2009).

Li, et al., Development of a Nano-Ni-La-Fe/Al2O3 Catalyst to be Used for Syn-Gas Production and Tar Removal After Biomass Gasification, BioResources 4(4), 1520-1535 (2009).

Xu, et al., Recent Advances in Catalysts for Hot-Gas Removal of Tar and NH3 from Biomass Gasification, Fuel, vol. 89, Issue 8, pp. 1784-1795 (available on-line Feb. 18, 2010).

SUNDAC, Nikola "Catalytic Cracking of Tar from Biomass Gasification", Dept. of Chemical Engineering, Lund University, Lund, Sweden (Sep. 2007).

"Technology of Biomass Gasification" (Accessed Mar. 2011).

* cited by examiner

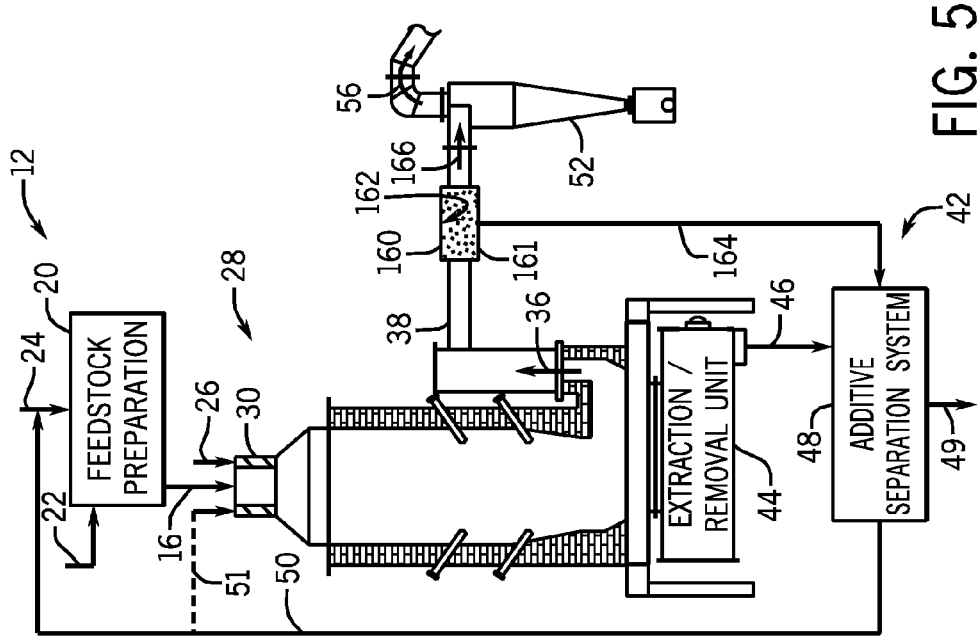
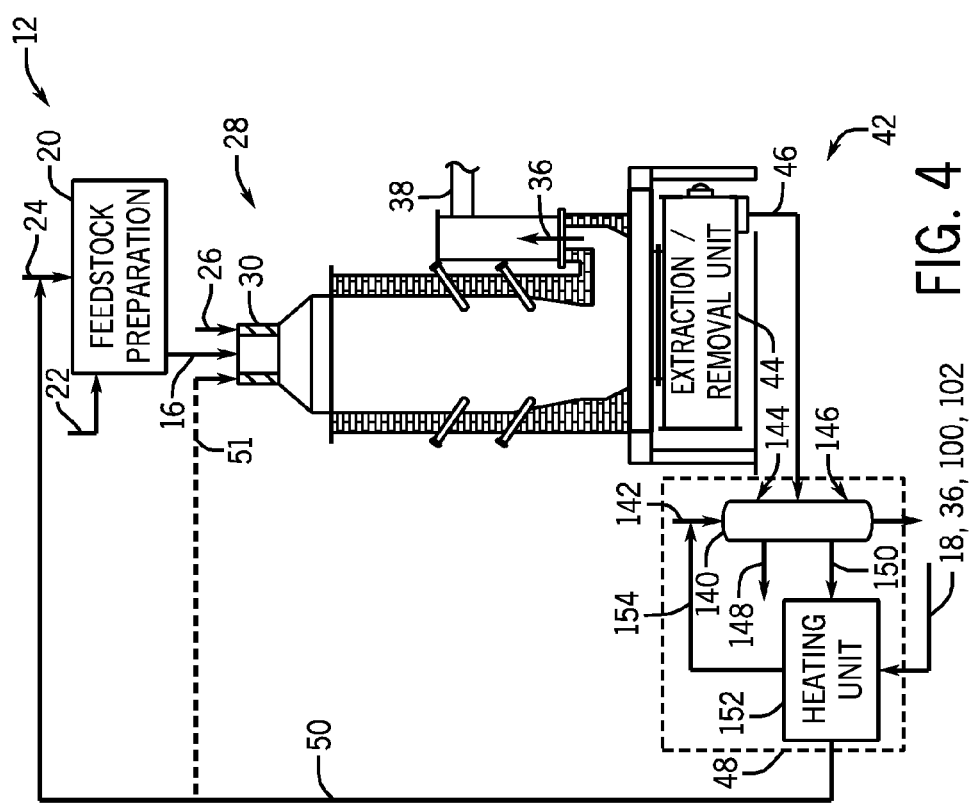

ADDITIVE SYSTEMS FOR BIOMASS GASIFICATION

BACKGROUND OF THE INVENTION

The subject matter disclosed herein relates to biomass gasification systems and, more specifically, to additive systems for biomass gasification systems.

In biomass gasification processes, a solid fuel such as sawdust, agricultural wastes, wood wastes, and the like, is gasified to generate a gaseous fuel. The biomass generally includes polysaccharides that have been produced by photosynthesis, such as cellulose, hemicellulose, and lignin. During the gasification of these materials, the biomass, in the presence of air, is converted into a more combustible form, referred to as producer gas. In some systems, the producer gas may be combusted by an engine to produce electricity. In other systems, the producer gas may be used to generate heat or to generate substitute natural gas (SNG), oxygenated solvents such as methanol, dimethyl ether, or the like.

The producer gas includes combustible gases such as carbon monoxide (CO), hydrogen ($H_2$), and methane ($CH_4$), among others. In addition to producing the combustible gases noted above, the biomass gasification process also produces significant amounts of tar compared to other gasification processes. The tar may include molecules having a molecular weight higher than benzene ($C_6H_6$), including aromatic hydrocarbons, polyaromatic hydrocarbons (PAH's), heterocyclic aromatics, and the like. While certain tars may not have a substantial effect on the operation of a power plant having the biomass gasification system, other tars may condense and/or crystallize within certain equipment, thereby causing a reduction in plant efficiency and, in some situations, plant downtime.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a biomass gasification system includes a feedstock preparation system configured to generate a biomass feedstock having a biomass fuel and a tar cracking additive, a gasifier configured to receive the biomass feedstock and gasify the biomass fuel in the presence of the tar cracking additive to generate first and second mixtures. The first mixture includes producer gas and a first portion of the tar cracking additive and the second mixture has a second portion of the tar cracking additive and ash. The biomass gasification system also includes an additive recycle system configured to generate a recycled additive feed for the feedstock preparation system, wherein the recycled additive feed includes the first portion of the tar cracking additive, or the second portion of the tar cracking additive, or a combination thereof.

In a second embodiment, a biomass gasification system includes a feedstock preparation system configured to generate a biomass feedstock having a biomass fuel and a tar cracking additive, a gasifier configured to receive the biomass feedstock and gasify the biomass fuel in the presence of the tar cracking additive to generate first and second mixtures. The first mixture has producer gas and the second mixture has the tar cracking additive and ash. The biomass gasification system also includes an additive recycle system configured to receive the second mixture and to separate at least a portion of the tar cracking additive from the ash to generate a recycled additive feed for the feedstock preparation system.

In a third embodiment, a biomass gasification system includes a biomass gasifier configured to gasify a biomass feedstock in a reaction zone of the biomass gasifier to generate a first mixture having producer gas and tar, a first fixed catalyst bed having a first tar cracking catalyst, wherein the first fixed catalyst bed is disposed in the reaction zone and is configured to crack the tar within the first mixture to produce a second mixture having the producer gas and remaining tar. The biomass gasification system also includes a second fixed catalyst bed having a second tar cracking catalyst, wherein the second fixed catalyst bed is disposed in the gasifier downstream of the reaction zone and is configured to crack the remaining tar within the second mixture.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a diagrammatical illustration of an embodiment of a portion of a biomass gasification system having a separation vessel and a drying unit for recycling additive back into the reactor of FIG. 1; and FIG. 5 is a diagrammatical illustration of an embodiment of a portion of a biomass gasification system having an electrostatically-charged vessel for recycling additive back into the reactor of FIG. 1.

DETAILED DESCRIPTION OF THE INVENTION

Figure 1:
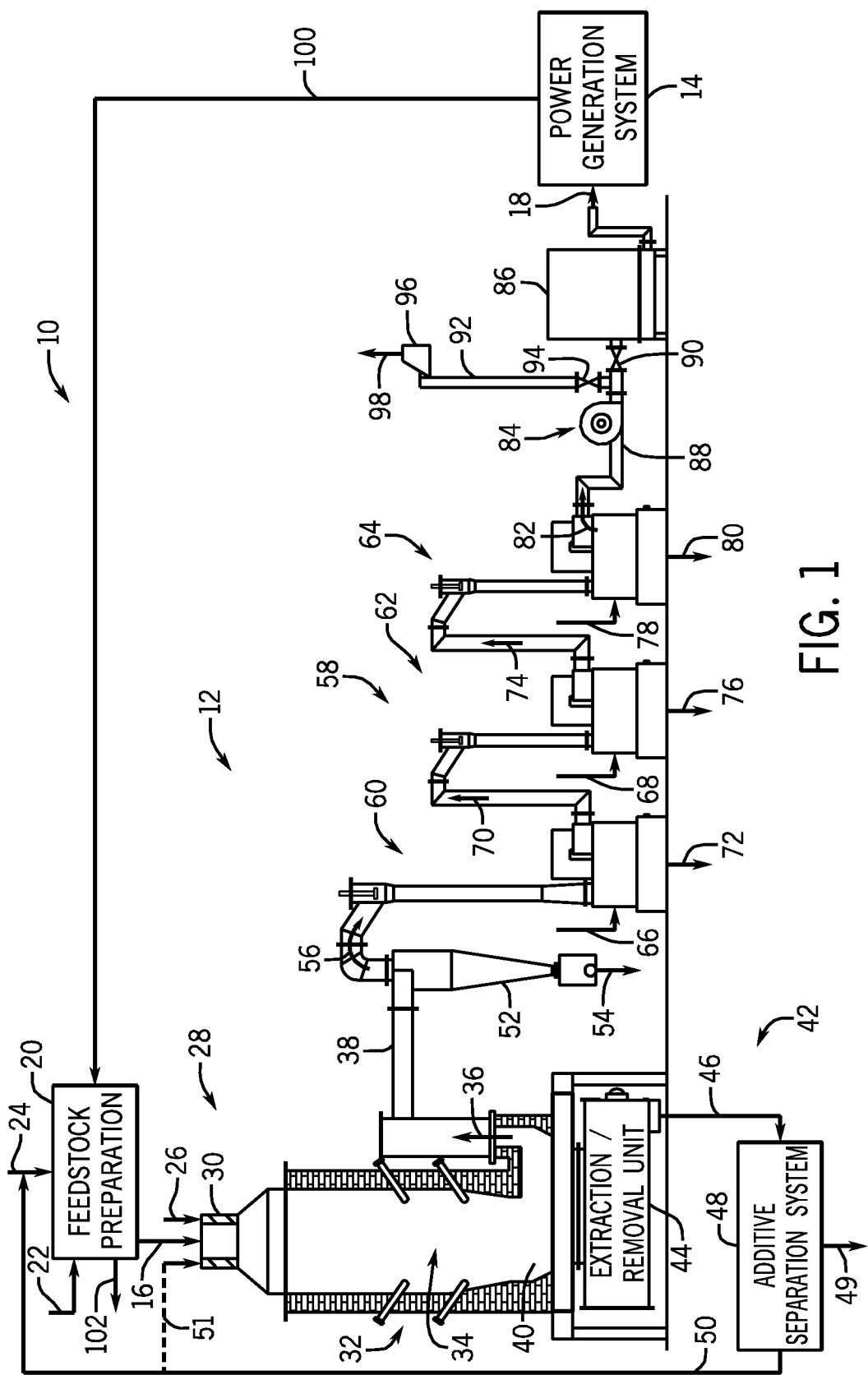
FIG. 1 is a diagrammatical illustration of an embodiment of a biomass gasification system having a feedstock preparation system and an additive recycle system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, the formation of tar within a biomass gasification reactor can have deleterious effects on various plant system components. For example, many of the components of tar have molecular structures that are polyaromatic, which allows facile sublimation and crystallization. These components are often carried along in the gas phase through a plant system. As the tar components concentrate and cool, they begin to crystallize, rather than condensing into a liquid. Such crystallization can clog various plant system components, such as valves, intake ports, turbine inlets, and so on. Examples of tar components that can hinder the operation of plants in this way include hydrocarbyl molecules such as naphthalene and its derivatives, fluorene, phenanthrene, anthracene, fluoranthene, pyrene, benzo-anthracene, chrysene, benzo-fluoranthene, benzo-pyrene, perylene, indeno-pyrene, dibenzo-anthracene, benzo-perylene, and the like. Moreover, other tar components that can polymerize and clog certain plant features may be contained within the gas mixture. These components may polymerize due to high temperatures and/or other polymerization initiators encountered as the gas mixture flows through the plant system. Such polymerizable components can include, for example, styrene and its derivatives, as well as other olefins. Generally, the concentration of these components is related to whether the components will crystallize and/or polymerize, with higher concentrations leading to a higher probability of crystallization and/or polymerization, and clogging.

Other tar components, such as those that may not necessarily crystallize within the biomass gasification system, can contaminate scrubbing water used in aqueous scrubbing units and can also reduce the combustion efficiency of the gas mixture produced by biomass gasification systems. As an example, these tar components can include molecules that are soluble and/or miscible with water, such as pyridine, phenol, cresol, and quinoline. Other aromatics that are not soluble and/or miscible with water also may contaminate scrubbing water, albeit to a lesser extent than the molecules listed above. However, because molecules that are not soluble in water may be difficult to remove from the gas mixture, these molecules can reduce combustion efficiency. These molecules may include toluene, xylenes, mesitylene, and the like. Other tar components may have non-aromatic molecular structures, such as cyclic parrafins (e.g., cyclopentane, cyclohexane, cyclooctane, decaline), and may have any or a combination of the undesirable characteristics mentioned above.

In sum, many of the tar components noted above may be in the gaseous phase while in the biomass gasification system, may not be miscible in water, and may, generally, be entrained with the gas mixture produced by the gasification system. Therefore, it may be difficult to completely separate tar from the producer gas using typical plant features. Moreover, while certain techniques have been developed for cracking the tar using a catalyst disposed downstream from the biomass gasifier, such techniques are often ineffective or are subject to further improvement. Accordingly, the present embodiments provide systems for mixing an additive that facilitates tar cracking with the biomass feed upstream of the biomass gasifier and/or within the biomass gasifier. Accordingly, the additive is present in the gasifier as the biomass fuel undergoes the gasification process. Therefore, the tar cracking catalyst may catalyze cracking of the tar molecules under gasification conditions. The cracking process, as defined herein, is intended to produce molecules having lower average molecular weights than the original tar molecules by breaking one or more chemical bonds within the original tar molecules. Indeed, because the cracked molecules (i.e., the molecules having a lower average molecular weight) are within the biomass gasifier, they may, in some embodiments, undergo gasification. As discussed below, the additive may include, in addition to a tar cracking catalysts, other components such as a gasification catalyst, a promoter, or a fluxant.

According to certain embodiments, the additive includes a tar cracking catalyst containing relatively abundant materials such as dolomite ($CaMg(CO_3)_2$), silicates such as olivines (e.g., $MgSiO_4$, $FeSiO_4$, $MnSiO_4$, $CaMgSiO_4$, $CaFeSiO_4$), and other alkaline earth materials. Alternatively or additionally, the additive may include more complex catalysts such as zeolites or precious and/or noble metal catalysts. While certain of the tar cracking catalysts listed above may be relatively inexpensive and abundant (e.g., dolomite, olivine), certain of the catalysts may have a relatively high cost (e.g., zeolites, precious and/or noble metal catalysts). Although these high cost catalysts may be more expensive, these catalysts also may have higher catalytic activity, higher efficiency, desirable performance, and so on. Accordingly, it may be desirable to use such catalysts in certain processes despite their high cost. Additionally, while the abundant catalysts may be relatively inexpensive, it may be desirable to increase the efficiency of a system by extending catalyst life. Therefore, the present embodiments provide systems for recovering the catalyst from the biomass gasifier, purifying the catalyst, and recycling the catalyst back to the biomass gasifier. Indeed, the additive recycle systems in accordance with the present embodiments may increase plant efficiency, decrease the costs associated with generating producer gas, and/or increase the purity of producer gas generated within biomass gasification systems.

Keeping in mind that these systems and approaches towards tar reduction and additive recovery may be used in many gasification processes (e.g., entrained flow gasification processes), the disclosed embodiments will be discussed in the context of a biomass gasification system having a downdraft gasifier. FIG. 1 is a schematic illustration of a system 10, such as a plant system, that includes a biomass gasification system 12 integrated with a power generation system 14. Generally, the biomass gasification system 12 gasifies a biomass feedstock 16 to produce a treated producer gas 18 that can be directed to the power generation system 14 to generate power. In general, producer gas is a type of synthesis gas (syngas) that may be produced by the relatively low temperature (e.g., less than approximately 2000° C.) gasification of biomass in the presence of air. When compared to typical types of synthesis gas produced by coal gasification in the presence of purified oxygen, producer gas generally has a lower energy density due to $N_2$ dilution. For example, according to certain embodiments, producer gas may have an average energy density of approximately 3500-5000 kJ/m$^3$, while coal gasification syngas may have an average energy density of approximately 7500-9000 kJ/m$^3$. Thus, producer gas, as defined herein, is a gas produced from the gasification of a biomass feed to produce CO, $H_2$, and $CO_2$, as well as other components, and having a lower energy density than syngas formed by coal gasification.

The treated producer gas 18 is provided to the power generation system 14 as a fuel source. As an example, the treated producer gas 18 may be combusted within one or more engines (e.g., gas turbine engines) contained within the power generation system 14 to produce electricity. The treated producer gas 18 also may have a number of other uses, such as for the production of synthetic natural gas (SNG), for heating (e.g., in dryers, kilns, furnaces, boilers), and so on.

The system 10 includes a feedstock preparation unit 20, which prepares the biomass feedstock 16 using a biomass fuel source 22 and one or more additives 24. Therefore, the biomass feedstock 16, in some embodiments, includes at least the biomass fuel source 22 and the additive 24. The biomass fuel source 22 may include agricultural wastes, wood, saw dust, and the like. The feedstock preparation unit 20 may condition the biomass fuel source 22 to generate the biomass feedstock 16. The conditioning may include selecting, sizing, and/or drying the biomass fuel source 22, as well as mixing the biomass fuel source 22 with the additive 24.

In accordance with the present embodiments, the additive 24 includes at least a tar cracking catalyst. Non-limiting examples of such catalysts include dolomite, olivine, or other precious and/or noble metal-based catalysts such as rhodium (Rh), ruthenium (Ru), iridium (Ir), platinum (Pt), palladium (Pd), copper (Cu), cobalt (Co), iron (Fe) nickel (Ni), zirconium (Zr), manganese (Mn), molybdenum (Mo), titanium (Ti), silver (Ag), tin (Sn), and lanthanum (La)-based catalysts, or any combination thereof. For example, in some embodiments, the catalyst may be an organometallic catalyst having a transition metal bound to an organic ligand. Further, some of the catalysts listed above may be supported on an inorganic support, such as a calcined or non-calcined metal oxide such as alumina ($Al_2O_3$), ceria ($Ce_2O_3$), titania ($TiO_2$), zirconia ($ZrO_2$), silica ($SiO_2$), lanthana ($La_2O_3$), and the like.

In certain of these embodiments, the additive 24 may also include one or more additional components, such as a gasification catalyst (e.g., Pt, Ru, Rh, Pd, Ir, Ni, Fe, Co, $MOS_2$, Co—$MoS_2$, $K_2CO_3$, $Na_2CO_3$, $N_2S$, $K_2S$) to facilitate one or more reactions of the gasification process, a promoter to facilitate catalyst activation (e.g., Rh, Zr, Mn, Mo, Ti, Au, Ag, or Sn), a fluxant (e.g., $CaCO_3$) to facilitate flow of the solid biomass feed, or a combination thereof. For example, in embodiments where the additive includes a precious and/or noble metal catalyst for catalytic gasification, the gasification catalyst may catalyze gasification of the cracked molecules, produced using the tar cracking catalyst, under the gasification conditions. Specifically, the gasification catalyst may, in certain embodiments, catalyze one or more reactions within the gasification process, such as pyrolysis, drying, combustion, reduction, water-shift, and methane reforming, with respect to the biomass fuel or reaction products formed therefrom. Furthermore, it is recognized that certain tar cracking catalysts also may have at least some activity for gasification, methane reforming, and other similar processes. For example, dolomite and olivine, in addition to catalyzing the cracking of tar, may catalyze one or more of the gasification reactions. Therefore, while discussed in the context of tar cracking catalysts, it is also realized that certain of the additives and catalyst beds described herein may possess catalytic activity for tar cracking and gasification processes.

After the additive 24 and biomass fuel source 24 have been mixed and further processed (e.g., dried, ground, pelletized), the biomass feedstock 16 is directed, along with air 26, to a biomass gasifier 28. While the biomass gasifier 28 is discussed and presented as a down-draft gasifier, it should be noted that other types of biomass gasifiers are also presently contemplated, including updraft gasifiers. The illustrated biomass gasifier 28 is an open air gasifier having an inlet 30 that enables the gasifier 28 to receive a substantially constant influx of the air 26 and the biomass feedstock 16. A series of reactions, which are collectively referred to as the gasification process, occur within the biomass gasifier 28. The process includes combustion of the biomass feedstock 16 and the air 26 in the presence of moisture, as well as pyrolysis, reduction, and so forth. The biomass within the biomass feedstock 16 is combusted at sub-stoichiometric fuel-to-air ratios to produce, along with some CO and $H_2$, carbon dioxide ($CO_2$), water ($H_2O$), and a hot char or hot ash bed. The biomass gasifier 28 includes a plurality of inlets 32 (e.g., nozzles) that are configured to allow air 26 to enter the biomass gasifier 28 to promote, for example, one or more combustion reactions. According to certain embodiments, the inlets 32 may be spaced circumferentially around the biomass gasifier 28 to provide a substantially homogeneous influx of the air 26 into the biomass gasifier 28. In certain embodiments, which are discussed in detail below with respect to FIG. 2, the inlets 32 also may be used to directly inject additives into one or more reaction zones 34 of the gasifier 28.

The combustion reaction, which is oxidative, is generally exothermic and produces, in certain embodiments, temperatures within the biomass gasifier 28 of between approximately 1300 Kelvin (K) and 1600 K. As an example, the temperatures within the biomass gasifier 28 may reach approximately 1300 K, 1350 K, 1400 K, 1450 K, 1500 K, 1550 K, 1600 K, or more during the sub-stoichiometric combustion reaction. The $CO_2$ and $H_2O$ produced by the combustion reaction may pass through, or otherwise contact, the char or ash bed and undergo a reduction to generate CO, $H_2$, and some $CH_4$. In certain embodiments, the reduction process may be facilitated (e.g., catalyzed) using the additive 24.

The reduction reaction that is performed to produce the CO and $H_2$ is endothermic, and therefore requires heat. The bulk of the reduction reaction may therefore use heat produced by the combustion reaction, and may also use any latent heat from the hot char or ash bed. Moreover, because the biomass gasifier 28 is an open-top gasifier, the temperatures within the gasifier 28 may also be reduced by a substantially constant influx of the air 26. Other materials are generated from the gasification process in addition to the desired $CO_2$ and $H_2$ gases, including tar (e.g., via pyrolysis). As defined herein, tar is intended to denote any hydrocarbyl, such as aromatic hydrocarbons, heteroaromatics, polyaromatic hydrocarbons, heterocycles (not necessarily aromatic) and derivatives thereof having a molecular weight greater than benzene ($C_6H_6$, approximately 78 grams per mole) and that are produced in the gasification process described above. Other non-limiting examples of tar molecules are provided above prior to the discussion of FIG. 1. Again, as noted above, the additives 24 are designed to facilitate the cracking of tar formed by the gasification process. Further, in certain embodiments, the additives 24 may facilitate cracking of at least a portion of the tar and also facilitate gasification of the cracked products to generate additional CO, $H_2$, and $H_2O$. Moreover, although additional $CH_4$ may be produced, certain additives 24 may also be used for methane reforming to convert the $CH_4$ into CO, $H_2$, and $H_2O$.

The gasification process, as noted above, produces CO, $H_2$, tar, char, and other gases (e.g., diluent $N_2$, acid gases). The combination of gases formed in the biomass gasifier 28 exits an outlet 38 of the biomass gasifier 28 as a first gas mixture 36. The first gas mixture 36 also may include particulates, such as dust, some char, as well as some of the additive 24. Although some of the particulates from the biomass gasifier 28 may exit the biomass gasifier 28 as part of the first gas mixture 36, a substantial portion of the particulates may remain in the gasifier 28 and collect in a bottom portion 40 of the gasifier 28. For example, according to certain embodiments, approximately 0.1 to 100%, (e.g., between approximately 0.1 and 100%, 10 and 90%, 20 and 80%, or 30 and 70%), of the particulates in the gasifier 28 may collect in the bottom portion 40. The particulates, as noted above, include the additive 24, char, and/or dust, as well as other components.

In accordance with present embodiments, rather than disposing of catalyst that has suitable activity, at least a portion of the additive 24 is recycled to the feedstock preparation system 20 using an additive recycle system 42. The additive recycle system 42 includes, among other features, an extraction/removal unit 44. The extraction/removal unit 44 removes the particulates through a particulate stream 46 in a continuous or batch operation. For example, in certain embodiments, the extraction/removal unit 44 may remove particulates from the bottom portion 40 of the biomass gasifier 28. According to certain embodiments, the extraction/removal unit 44 may remove approximately 1 to 100% of the particulates collected in the bottom portion 40 of the biomass gasifier 28. More specifically, the extraction/removal unit 44 may remove approximately 10 to 90%, 20 to 80%, 30 to 70%, 40 to 60%, or approximately 50% of the particulates collected in the bottom portion 40 of the biomass gasifier 28. In one embodiment, the extraction/removal unit 44 may remove substantially all of the particulates collected in the bottom portion 40.

When the extraction/removal unit 44 is operating in a continuous removal mode, the particulates may continuously flow, for example, by gravity and/or by pneumatic force, among others, from the bottom portion 40 of the biomass gasifier 28 and through the extraction/removal unit 44. In such embodiments, the particulates may exit the extraction/removal unit 44 as the particulate stream 46, which may be provided continuously to an additive separation system 48. When operating in a batch mode, the extraction/removal unit 44 may periodically remove the particulates from the bottom portion 40. As an example, after a desired amount of the particulates have been collected in the extraction/removal unit 44, for example, as measured by weight or by volume, the particulates may be removed. In other embodiments, the extraction/removal unit 44 may remove the particulates from the bottom portion 40 of the biomass gasifier 28 at time intervals. For example, a flow of pressurized gas may be cycled on and off using one or more valves to periodically direct the particulates into the extraction/removal unit 44. The particulates collected in the extraction/removal unit 44 during batch mode may be sent periodically to the additive separation system 48 as the particulate stream 46.

The additive separation system 48 is generally designed to separate the additive 24 from other types of particulates, such as char, dust, and the like. As an example, the additive separation system 48 may include one or more separation vessels that separate the additive 24 from the particulates using differences in solubility, density, electrostatic charge, mass-to-charge ratio, magnetic susceptibility, and/or differences in molecular structure, among others, to produce waste particulates or ash 49 (and an additive recycle feed 50. The additive separation system 48 also may include other features, such as features used to dry or otherwise treat the additive 24 prior to sending the additive 24 as the additive recycle feed 50 to the feedstock preparation system 20 or, in other embodiments, directly to the gasifier 28 using a conduit 51.

While the majority of the particulates exit the biomass gasifier 28 through the extraction/removal unit 44, the first gas mixture 36 exits the biomass gasifier 28 through the outlet 38. The outlet 38 directs the first gas mixture 36 to a cyclone 52. The cyclone 52 removes a substantial portion of particulates 54 that may be present in the first gas mixture 36 to produce a cycloned gas mixture 56, which is directed to a scrubbing system 58. The illustrated scrubbing system 58 includes a first scrubber 60, a second scrubber 62, and a chilled water scrubber 64. However, in other embodiments, any number of one or more scrubbers, as well as other types of cleaning and/or treatment equipment may be included in the scrubbing system 58.

The first and second scrubbers 60, 62 each use respective first and second water feeds 66, 68 to scrub the producer gas. For example, the first scrubber 60 is configured to receive the first water feed 66 that removes particulates from the cycloned gas mixture 56 via nucleation. Moreover, the first water feed 66 may remove at least a portion of water-soluble components, such as certain acid gases, water-soluble and/or water-soluble tars, from the cycloned gas mixture 56. The cycloned gas mixture 56, therefore, is treated in the first scrubber 60 to produce a first scrubbed gas mixture 70. The first scrubbed gas mixture 70 will generally have a lower concentration of particulates, tar, and other gasification by-products compared to the cycloned gas mixture 56. Therefore, the first scrubber 60, in addition to producing the first scrubbed gas mixture 70, produces a first blackwater stream 72. The first blackwater stream 72 may include tar, dissolved gases (e.g., acid gases and a minor amount of CO, $H_2$, and $CO_2$), and some small particulates not removed in the cyclone 52. The first blackwater stream 72 may be sent to a water treatment system or similar facility for purification.

The second scrubber 62 operates in generally the same fashion as the first scrubber 60 to produce a second scrubbed gas mixture 74 and a second blackwater stream 76. The second scrubbed gas mixture 74 will generally have a lower tar, acid gas, and particulate content compared to the first scrubbed gas mixture 70. The second scrubbed gas mixture 74 is sent to the chilled water scrubber 64, which performs desiccation and scrubbing on the second scrubbed gas mixture 74.

To perform desiccation and scrubbing, the chilled water scrubber 64 receives a stream of chilled water 78 from a chilled water source. The stream of chilled water 78 may be atomized and contacted with the second scrubbed gas mixture 74, which causes the second scrubbed gas mixture 74 to cool. Because the chilled water 78 has a temperature below the boiling point of water, a substantial portion of any water contained within the second scrubbed gas mixture 74 may condense. This condensation desiccates the second scrubbed gas mixture 74. The chilled water 78, which is atomized in the chilled water scrubber 64, also scrubs the second scrubbed gas mixture 74 to remove a substantial portion of any particulates that may be present. Therefore, the chilled water 78 may absorb or otherwise entrain particulates, as well as acid gases and the like, to produce a stream of greywater 80 and a scrubbed gas stream 82. The stream of greywater 80 may be sent to a chilled water tank, a water treatment facility, or a similar plant feature.

The scrubbed gas stream 82 exiting the scrubbing system 58 is then passed through a blower 84, which provides motive force to direct the gases and other light materials through the gasification system 12. The scrubbed gas stream 82 is then sent to a filter system 86. The filter system 86 includes one or more filters designed to remove dust from the scrubbed gas stream 82. A conduit 88 connecting the chilled water scrubber 64 with the filter system 86 includes a first valve 90 configured to stop, start, increase, or decrease a flow rate of the scrubbed gas stream 82 through the conduit 88. Indeed, in certain embodiments, it may be desirable to reduce or stop the flow of the scrubbed gas stream 82. For example, it may be desirable to stop the flow of the scrubbed gas stream 82 to reduce the pressure of the system 12 or to allow servicing of the filter system 86. Accordingly, the first valve 90 may close and send a flow of the chilled scrubbed gas stream 82 into a divergent conduit 92. Specifically, a second valve 94 may open to direct the scrubbed gas stream 82 to the divergent conduit 92, which leads to a flare 96, which may burn the scrubbed gas stream 82.

During normal operation of the system 12, most of, or all of, the scrubbed gas stream 82 is directed to the filter system 86. The filter system 86, as noted above, removes dust from the scrubbed gas stream 82 to produce the treated producer gas 18. The treated producer gas 18 is then provided to the power generation system 14, which, according to certain embodiments, may be a Jenbacher system having a prime mover, such as a compression or spark ignition engine or may include one or more gas turbine engines. In these embodiments, the engine may drive a generator that produces electricity. However, in other embodiments, the power generation system 14 may be any suitable type of power generation system. Exhaust gases 100 produced at the power generation system 14 (e.g., by the engine) are sent to the feedstock preparation system 20, where the hot exhaust gases 100 may be used to dry the biomass fuel source 22 and/or, according to certain of the present embodiments, the additive 24. Cooled exhaust gases 102 are then discharged from the system 10 via a stack or similar feature. In certain embodiment, exhaust gases 100 may be divided into two streams, one used to dry feed stock 22 and other to dry additives 24.

Figure 2:
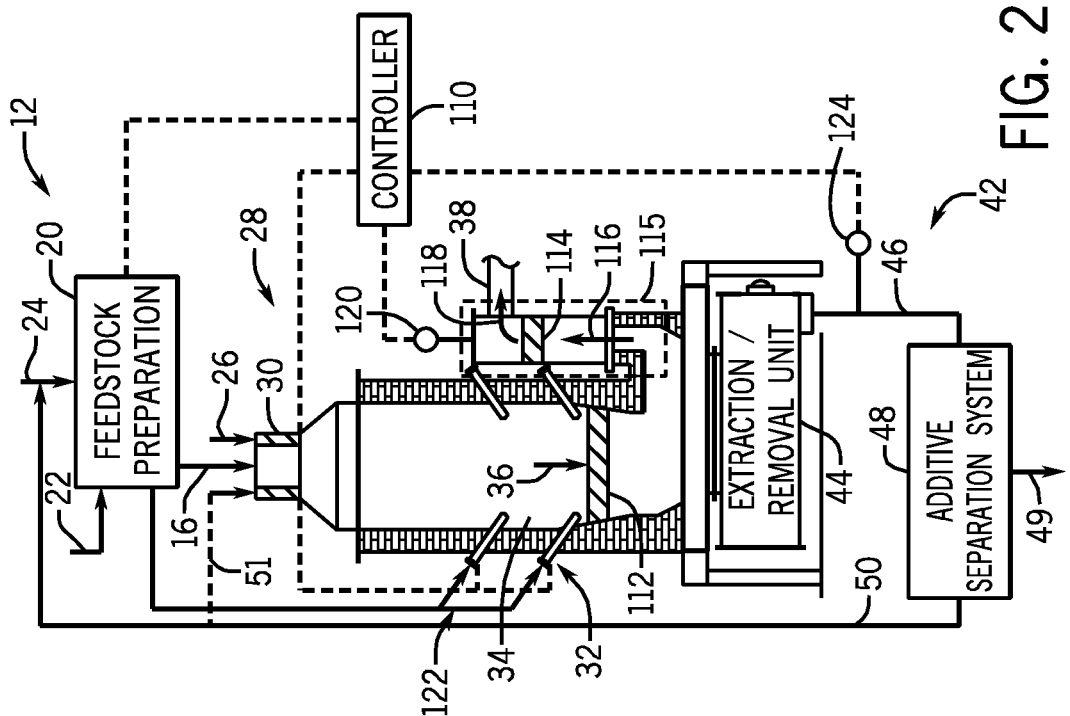
FIG. 2 is a diagrammatical illustration of an embodiment of a portion of a biomass gasification system having a reactor with multiple fixed catalyst beds and multiple ports for additive injection into one or more reaction zones.

As noted above, certain of the present embodiments provide for the addition of one or more additives 24 to the feedstock 16 to catalyze tar cracking within the biomass gasifier 28. The additive 24 also may include components to facilitate certain physical and chemical processes such as flow and/or one or more reactions of the gasification process. FIG. 2 illustrates an embodiment of the biomass gasification system 12 that includes a controller 110 for monitoring the gasification process and fixed catalyst beds 112 and 114 for providing additional additive 24 to the gasifier 28. The controller 110 may be employed to adjust feed rates of the biomass fuel source 22, the additive 24, and/or the biomass feedstock 16. According to certain embodiments, the controller 110 may monitor the gasification process occurring within the gasifier 28 at the outlet 38, and may adjust feed rates of each of the biomass fuel source 22 and the additive 24 to regulate the gasification process. Although the controller 110 is described below in the context of the gasifier 28 of FIG. 2, the controller 110 and associated monitors 120 and 124 can also be employed in gasifiers that do not include catalyst beds, such as the gasifier 28 shown in FIG. 1.

In some embodiments, the fixed catalyst beds 112, 114 may be used in addition to or in lieu of the additive 24 that is directed to the biomass gasifier 28 through the feedstock preparation system 20. Therefore, in some embodiments, no additive 24 may be used when multiple fixed catalyst beds 112 and 114 are present. Moreover, while the present embodiment is described in the context of two fixed catalyst beds, it should be noted that the present approaches may be applicable to a gasifier having any number of fixed beds, such as between 1 and 10, 2 and 8, or 3 and 6 fixed catalyst beds.

Like the additive 24, the fixed catalyst beds 112, 114 are generally designed to catalyze the tar cracking process. The fixed catalyst beds 112, 114 may include the same or different catalysts as one another. Further, the catalysts employed in the fixed catalyst beds 112 and 114 may be selected from catalysts that are the same or different from the tar cracking catalysts included in the additive 24. The fixed catalyst beds 112 and 114 may include one or more supports having a non-movable bed of any one or a combination of the catalysts mentioned above in a pelletized or similar form. For example, the fixed catalyst beds 112 and 114 may include tar cracking catalysts such as dolomite, olivine, or other precious and/or noble metal-based catalysts such as rhodium (Rh), ruthenium (Ru), iridium (Ir), platinum (Pt), palladium (Pd), copper (Cu), cobalt (Co), iron (Fe) nickel (Ni), zirconium (Zr), manganese (Mn), molybdenum (Mo), titanium (Ti), silver (Ag), tin (Sn), and lanthanum (La)-based catalysts, or any combination thereof. In certain of these or other embodiments, the fixed catalyst beds may additionally or alternatively include one or more additional catalysts, such as a gasification catalyst (e.g., Pt, Ru, Rh, Pd, Ir, Ni, Fe, Co, $MOS_2$, Co—$MoS_2$, $K_2CO_3$, $Na_2CO_3$, $N_2S$, $K_2S$) or a combination thereof, among others. To facilitate discussion, the catalyst beds 112 and 114 are presented in the context of including a tar cracking catalyst. However, it is recognized that the catalyst beds in accordance with the present embodiments may include catalysts displaying catalytic activity for certain other processes, such as gasification reactions (e.g., catalytic reduction, methane reforming, or water-shift).

Initially, such as at the onset of a gasification process, the gasifier 28 receives the feedstock 16 that includes the biomass fuel 22, as well as the additive 24. As noted above with respect to FIG. 1, the biomass fuel 22 undergoes the gasification process in the presence of air 26 and moisture. The additive 24 includes one or more tar cracking catalysts that facilitate the cracking of tar during the gasification process. Further, in certain embodiments, the additive 24 may include additional components, such as fluxants to facilitate flow, promoters to facilitate catalyst activation (e.g., Rh, Zr, Mn, Mo, Ti, Au, Ag, or Sn), and/or gasification catalysts to promote the production of producer gas, the reforming of methane, and the like. As noted above with respect to FIG. 1, the first gas mixture 36 generated by the gasification process may include particulates such as ash, tar, additive 24, and so forth.

Within the biomass gasifier 28, the first gas mixture 36 contacts the first fixed catalyst bed 112, as indicated by an arrow 36. The fixed catalyst bed 112 is positioned within the gasifier 28 in the reaction zone 34. The reaction zone 34 may be a pyrolysis zone, a combustion zone, a throat of the gasifier 28, a reduction zone, or any combination thereof. According to certain embodiments, the fixed catalyst bed 112 may be positioned within a reaction zone where temperatures are at a relative maximum within the gasifier 28, such as at a transition between the combustion zone and the reduction zone where the first gas mixture 36 is formed. When the fixed catalyst bed 112 is positioned within the reaction zone 34, the fixed catalyst bed 112 may provide enhanced catalytic activity (e.g., tar cracking catalysis, gasification catalysis, methane reforming catalysis) compared to the activity obtained by other configurations (e.g., a catalyst bed positioned downstream from the gasifier 28). For example, the higher temperatures within the reaction zone 34 compared to other areas of the system 10, as well as a higher abundance of certain materials (e.g., steam, char, ash) within the reaction zone 34, may enable enhanced catalytic activity.

Upon contacting the fixed catalyst bed 112, which includes a tar cracking catalyst, at least a portion of the tar contained within the first gas mixture 36 may be cracked. The cracking process forms smaller molecules having, on average, lower molecular weights compared to the original tar molecules. The formation of smaller molecules may reduce the amount of tar within the first gas mixture 36 and may further generate molecules that may be gasified, which can increase the concentration of desirable combustible gases (e.g., CO, $H_2$, $CH_4$) within the producer gas. Therefore, after contacting (i.e., passing through) the first fixed catalyst bed 112, a second gas mixture 116 may be formed, represented as an arrow. The second gas mixture 116 has a lower tar concentration compared to the first gas mixture 36. Indeed, the first fixed catalyst bed 112 may reduce the tar concentration of the first gas mixture 36 by between approximately 1 and 100%, such as between approximately 10 and 90, 20 and 80, 30 and 70, 40 and 60, or approximately 50%.

The second gas mixture 116, which includes CO, $CO_2$, $H_2$, $H_2O$, $CH_4$, and other components such as tar and particulates, flows through the gasifier 28 and encounters the second fixed catalyst bed 114. In a general sense, the second fixed catalyst bed 114 is disposed downstream from the first fixed catalyst bed 112, and may include the same and/or different catalyst as the first fixed catalyst bed 112. As depicted, the second fixed catalyst bed 114 is disposed at an area 115 between the reaction zone 34 and the outlet 38. The area 115 is an area where the flow direction is opposite (e.g., reversed) compared to the area where gasification is performed (e.g., the reaction zone 34). That is, the area 115 has a flow direction that is oriented opposite with respect to the downdraft gasification process. In certain embodiments, the area 115 may be considered to be an updraft section of the biomass gasifier 28. In the illustrated embodiment, the second fixed catalyst bed 114 also includes a tar cracking catalyst and is disposed proximate the outlet 38 of the gasifier 28. Such a configuration where the second fixed catalyst bed 114 is disposed within the gasifier 28 may be advantageous, as the gases within the gasifier 28 often have a temperature in excess of 1000° C., which enhances catalytic activity. Indeed, the second fixed catalyst bed 114 may have similar catalytic activity compared to the first fixed catalyst bed 112, and may reduce the tar concentration of the second gas mixture 116 to produce a third gas mixture 118. As an example, the second fixed catalyst bed 114 may reduce the tar concentration of the second gas mixture 116 by between approximately 1 and 100%, such as between approximately 10 and 90, 20 and 80, 30 and 70, 40 and 60, or approximately 50%.

As noted above, the gasifier 28 may include multiple fixed catalyst beds similar or the same as the catalyst beds discussed above. For example, the gasifier 28 may have a fixed catalyst bed zone where the gases within the gasifier 28 pass through a plurality of beds (e.g., two or more), each having the same or different catalysts. For example, the first gas mixture 36 may encounter the first fixed catalyst bed 112 within the reaction zone 34, such as a pyrolysis zone, a combustion zone, or a reduction zone. The second gas mixture 116 would then contact a plurality of beds in a downstream reaction zone, such as the combustion zone or the reduction zone. Indeed, as the gas mixtures produced within the reaction zones encounter a plurality of such catalyst beds, the producer gas generated within the biomass gasifier 28 may have a lower tar concentration and a higher CO and $H_2$ concentration.

In embodiments where the biomass gasifier 28 includes the fixed catalyst beds 112, 114 and is communicatively coupled to the controller 110, the controller 110 can be employed to monitor the outputs of the gasifier 28 to ascertain the catalytic effectiveness of the fixed catalyst beds 112, 114 and/or the additive 24. The controller 110 may include a distributed control system (DCS) or any computer-based workstation that is fully or partially automated. For example, the controller 110 can be an application-specific or a general purpose computer having one or more microprocessors, instruction set processors, graphics processors, analog to digital converters, interface boards, and/or related chip sets. The controller 110 may also include storage features and data-accessing features. A processor within the controller 110 may run one or more computer-based monitoring and/or control routines accessed from locally stored memory or from a storage medium such as an optical disc or solid state memory. The one or more routines may be performed by the controller 110 to monitor certain processes within the biomass gasifier 28. For example, the controller 110 may monitor the third gas mixture 118 exiting the gasifier 28, the particulate stream 46 exiting the extraction/removal unit 44, and/or the particulate stream 46 entering the additive separation system 48, or a combination thereof, to ascertain one or more parameters indicative of catalytic efficiency and/or gasification efficiency, among others.

For example, the controller 110 may receive data signals from a first monitor 120 disposed in the flow path of the third gas mixture 118 and located in the gasifier 28 downstream from the second fixed catalyst bed 114. According to certain embodiments, the monitor 120 may be a sensor, such as a pressure sensor, a temperature sensor, a flow meter, or a combination thereof. Alternatively or additionally, the first monitor 120 may be a spectrometer, such as a gas chromatography-mass spectrometry unit (GC-MS), an infrared spectrometer, a Raman spectrometer, or a combination thereof. Therefore, the monitor 120 may detect properties, such as temperature, pressure, composition, and/or flow rate, of the third gas mixture 118 and may send signals indicative of these properties to the controller 110. Further, in certain embodiments, the monitor 120 may include analytical functionality. In these embodiments, the monitor 120 may perform an initial analysis on the third gas mixture 118, for example, to determine the composition, and may transmit signals representative of processed data to the controller 110.

The controller 110 may utilize the data from the monitor 120 to determine the composition of the third gas mixture 118. For example, the monitor 120 may employ algorithms, look up tables, and the like to determine the concentration of tar, $CH_4$, CO and/or $H_2$ based on the detected pressure, temperature, flow rate, and/or composition. The controller 110 may then determine whether the tar concentration, the $CH_4$ concentration, and/or the CO and $H_2$ concentrations are within acceptable levels. In embodiments where certain signals are indicative of a level outside of an acceptable range, such as when the tar concentration of the third gas mixture 118 is above a predetermined threshold, the controller 110 may make adjustments to the gasification system 12. For example, the controller 110 may determine the magnitude of the deviation from the acceptable level of the monitored parameter, and adjust a feed rate of the biomass fuel source 22 and/or a feed rate of the additive 24. Further, in other embodiments, the controller 110 may adjust a feed rate of the biomass feedstock 16 entering the gasifier 28.

To adjust the feed rates of the biomass fuel source 22, the additive 24 and/or the biomass feedstock 16, the controller 110 may transmit control signals to one or more features, such as valves, flow controllers, and the like, of the feedstock preparation system 20. Further, in certain embodiments, the controller 110 may transmit control signals to features, such as valves or flow controllers, of the feedstock preparation system 20 to cause additive 24 to be injected into the one or more reaction zones 34 of the gasifier 28 through the injectors 32 via an additive injection conduit 122. According to certain embodiments, the controller 110 may employ algorithms, look up tables, or similar control features to determine the feed rate adjustment for the feedstock preparation system 20.

While the illustrated embodiment provides the first monitor 120 for monitoring gas compositions, it may be desirable, additionally or in the alternative, to monitor other outputs of the gasifier 28, such as the particulate stream 46. Specifically, it may be desirable to monitor the ash 49 and/or the additive exiting the gasifier 28. For example, a second monitor 124, which may be a spectrometer or the like, can be disposed downstream of, or at the outlet of the extraction/removal unit 44 to measure the composition of the particulate stream 46. As discussed above, the controller 110 may employ data received from the monitor 124 to adjust the feed rates of the additive 24, the biomass fuel source 22, and/or the biomass feedstock 16. Further, in certain embodiments, the controller 110 may employ data received from the monitor 124 to adjust the injection rate of additive flowing through conduit 122 to enter the gasifier 28 through injectors 32.

Further, in other embodiments, manual sampling may be employed to monitor the composition of the gas mixture 118 and/or the particulate stream 46 in addition to, or instead of the monitors 120 and 124. For example, in certain embodiments, an operator or technician may sample the particles (e.g., ash 49 or char) within the particle stream 46 and analyze the samples in a laboratory or other testing facility to determine their composition. Moreover, in certain embodiments, an operator or technician may perform a visual inspection to monitor the color of the particulate stream 46, the color of the ash 49 collected in the extraction/removal unit 44, and/or the color of the ash 49 collected in the additive separation system 48. According to certain embodiments, data obtained by the manual sampling may be input into the controller 110, for example through a user interface, such as an operator workstation. The controller 110 may then employ this data to control operation of the gasifier 28.

Figure 3:
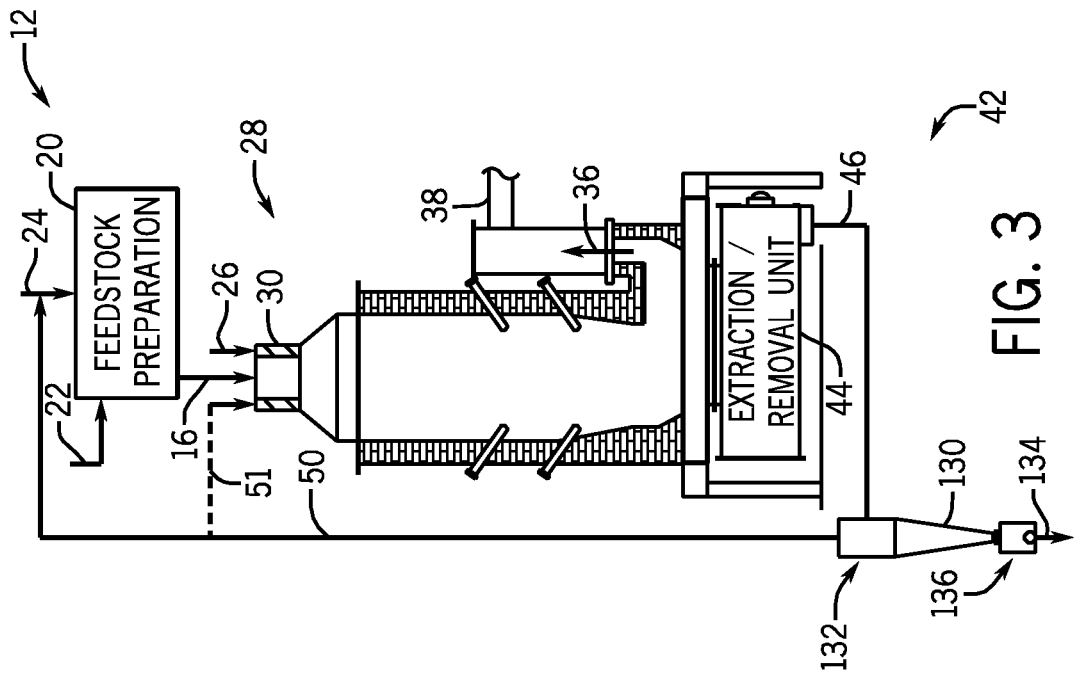
FIG. 3 is a diagrammatical illustration of an embodiment of a portion of a biomass gasification system having a cyclone for recycling additive back into the reactor of FIG. 1.

As noted above, the present embodiments, in addition to or in lieu of the catalyst bed and control features discussed above, also provide features for recycling the additive back to the gasifier 28. Such recycling may increase plant efficiency and decrease operational costs. FIG. 3 illustrates an embodiment of the additive separation system 48 that includes a cyclone 130 that separates the additive 24 from the ash 49 in the particulate stream 46. The cyclone 130 is designed to receive the particulate stream 46, and to separate the additive 24 from the ash 49 based on differences in density.

In certain embodiments, the additive 24 may have an average density that is lower than the average density of the ash 49. In these embodiments, as shown in FIG. 3, the additive 24 exits a top portion 132 of the cyclone 130, while ash 134 exits a bottom portion 136 of the cyclone 130. Because the additive 24 is dry and is substantially free of ash after separation at the cyclone 130, the separated additive 24 can be directly provided to the feedstock preparation system 20 as the recycled additive feed 50. However, in other embodiments, the separated additive 24 may undergo one or more treatments prior to being provided to the feedstock preparation system 20. For example, the separated additive may be heated, calcined, impregnated with additional catalyst, or the like. In other embodiments, the separated additive may be, on average, less dense than the ash. In these embodiments, the separated additive exits the bottom portion 136 of the cyclone 130, while the ash 134 exits the top portion 132.

FIG. 4 depicts another embodiment of the additive separation system 48. Rather than including a cyclone 130, the additive separation system 48 includes a separation vessel 140 for separating the additive 24 from the ash 49 using a liquid 142. The liquid 142 may be any suitable liquid for separating the ash 49 from the additive 24. As a non-limiting example, the liquid 142 may be an aqueous solution having dissolved salts, water, ethylene glycol, propylene glycol, or an organic solvent such as an alcohol (e.g., methanol, ethanol), an aromatic solvent (e.g., benzene), an alkane (e.g., butane, pentane, hexane, heptane), or others. The liquid 142 may be selected so that the liquid has a density that is intermediate to the respective densities of the ash 49 and the additive 24. This intermediate density may allow the separation of the ash 49 and the additive 24 in the separation vessel 140. For example, in certain embodiments, the ash 49 may have a lower density than the additive 24. In these embodiments, the liquid 142 may be selected to have a density that is greater than the density of the ash 49 but less than the density of the additive 24.

As depicted, the liquid 142 enters through a top portion 144 of the separation vessel 140 and collects within the vessel 140. The particulate stream 46, that includes the ash 49 and the additive 24, enters the vessel 140 through a side of the vessel 140 and intermixes with the liquid 142. As the particulate stream 46 and the liquid 142 mix, the ash 49 and the additive 24 within the particulate stream 46 separate based on their respective average densities. For example, in the illustrated embodiment, the ash 49 has a lower density than the liquid 142, and therefore collects on the surface of the liquid 142 within the top portion 144 of the vessel 140. On the other hand, the additive 24, which has a higher density than the liquid 142, sinks toward a bottom portion 146 of the separation vessel 140. In certain embodiments, after separation, the ash 49 may be decanted from the top portion 144 of the vessel 140 to remove a stream of ash 148. Further, in certain embodiments, the vessel 140 may be flushed with additional liquid 142 to produce the stream of ash 148 and a wet additive recycle stream 150. For example, the vessel 140 may be filled with the liquid 142 followed by a residence time during which the additive 24 and ash 49 are allowed to separate. After the residence time, the vessel 140 may then be flushed with the additional liquid 142 to force the separated components out of the vessel 140 to produce the streams 148 and 150.

The stream of ash 148 may be sent to, as an example, a liquid treatment facility to generate fresh liquid for the separation process, or for other purposes. The wet additive recycle stream 150 can be directed to a drying unit 152. In the drying unit 152, the wet additive recycle stream 150 can be dried using heat from one or more sources, such as from the producer gas 18, the first gas mixture 36, the exhaust gases 100, 102, or a combination of these. According to certain embodiments, the wet additive recycle stream 150 may be heated directly, such as via a countercurrent flow or indirectly, such as in a heat exchanger or a flash drum included within the heating unit 152. As the wet additive recycle stream 150 begins to dry, liquid 142 gets vaporized to form stream 154, or otherwise separated, from the additive 24. In certain embodiments, the stream 154 is cooled to liquid and can be recycled to the separation vessel 140 and used as make-up liquid. The dried additive exits the heating unit 152 as the additive recycle feed 50.

The additive recycle feed 50 from the heating unit 152 can then be provided to the feedstock preparation system 20. Further, in certain embodiments, the additive recycle feed 50 from the heating unit 152 may be provided directly to the gasifier 28 through conduit 51. Moreover, in certain embodiments, the heating unit 152 may be omitted, and the wet additive recycle stream 150 exiting the separation vessel 140 may be provided directly to the feedstock preparation system 20 where it can be subsequently dried with other feedstock materials using the exhaust gas 100 (FIG. 1).

FIG. 5 depicts an embodiment of the additive recycle system 42 that includes an electrostatic separation vessel 160 for removing charged particles within the first gas mixture 36. For example, while not wishing to be bound by theory, it is believed that certain molecules may, as a result of certain catalytic processes (e.g., tar cracking), be electrostatically charged as the first gas mixture 36 exits the gasifier 28. These molecules may include, as an example, tar molecules that have been cracked and/or additives 24 (e.g., catalysts) that have been a part of certain processes (e.g., catalytic processes). Indeed, it is believed that cracked molecules and tar cracking catalysts may be present in ionic form. Accordingly, the electrostatic separation vessel 160 may separate these charged molecules from the non-charged molecules by way of an electric and/or magnetic field.

As an example, the electrostatic separation vessel 160 may use an electrostatic charge to attract charged particles 161 to an inner surface 162 of the vessel 160. As the inner surface 162 of the vessel becomes coated with the charged particles 161, or reaches a desired level of coating, the vessel 160 may discharge the particles 161 as a charged stream 164. The charged stream 164 can be sent to the additive separation system 48, where the stream 164 may be processed as described above with respect to FIGS. 2-4 to separate ash 49 from the additive 24 and generate the additive recycle stream 50. The electrostatic separation vessel 160 may operate in a substantially continuous mode, or in a batch mode. According to certain embodiments, two or more electrostatic separation vessels 160 may be employed to separate the charged particles 161 from the gas mixture 36. In these embodiments, when the system is operated in batch mode, one electrostatic separation vessel 160 may be operational to separate charged particles from the gas mixture 36 while another electrostatic separation vessel 160 is taken offline to remove the charged particles that have been collected on the inner surface 162.

As noted above, the electrostatic separation vessel 160 may use an electric and/or magnetic field for charged particle 161 separation. The separation, therefore, may be based on charge, mass-to-charge ratio, magnetic moment, magnetic susceptibility, dipole moment, quadrupole moment, dielectric constant, or the like. As an example of embodiments where the electrostatic separation vessel 160 uses an electric field, the vessel 160 may house one or more charged plates across which a potential may be placed. The potential may cause the charged particles 161 to diverge from the main flow path of the first gas mixture 36 toward the inner surface 162. As another electric field example, a plurality of charged plates may be placed in a section of the vessel 160, such as within the main flow path of the first gas mixture 36, thereby creating one or more divergent flow paths for the charged particles 161. The divergent flow paths may flow the charged particles 161 against the inner surface 162, which may cause them to coat the inner surface 162 and separate from the first gas mixture 36.

As an example of embodiments where the electrostatic separation vessel 160 uses magnetic separation, the vessel 160 may include one or more permanent magnets, such as superconducting coils wound around a yoke. As a current flows through the coils at a voltage, a magnetic field having a direction and magnitude may be formed. The direction and magnitude may affect the charged particles, such that their flow paths are at least partially affected by the direction and magnitude of the field.

In another embodiment, the additive 24 may include a solid oxide support (e.g., particles of a solid oxide on which a catalyst is coated), or another support (e.g., a nanoparticle support) that can be magnetized or has a magnetic susceptibility. For example, the support may be particles of support material coated with or including ferromagnetic materials, such as ferromagnetic nanoparticles. When these additives 24 enter the electrostatic separation vessel 160, they may encounter the magnetic field, which causes them to become attracted to at least a portion of the inner surface 162 of the vessel 160. Indeed, it should be noted that the flow path of the charged particles 161 (or the magnetic particles) may be affected by the nature of the magnetic field. For example, a dipole magnetic field having a net direction may be used to steer the charged particles towards one portion of the inner surface 162. In another example, a quadrupole magnetic field having a generally annular orientation may be used to cause the charged particles to collect in a substantially regular fashion on the inner surface 162.

In the embodiments described above, as the charged particles flow against the inner surface 162, which may also be electrostatically charged, the particles may coat the surface 162 until a desired coating level has been obtained. Thereafter, the charged particle stream 164 may be discharged from the vessel 160 to generate the additive recycle stream 50 that is sent to the feedstock preparation system 20. The producer gas, free of charged particles 161, is directed to the cyclone 52, as illustrated by arrow 166, to produce the cycloned gas mixture 56.

It should be noted that the embodiments described above may be used together or separately. For example, the system 10 of FIG. 1 may be used in conjunction with the biomass gasifier 28 embodiments depicted in FIG. 2. According to certain embodiments, the biomass gasifier 28 of FIG. 1 may use the fixed catalyst beds 112, 114 and/or the controller 110 for adjusting the composition of the producer gas generated by the biomass gasifier 28, for example to generate producer gas having a reduced tar concentration. Additionally, the additive recycle system embodiments depicted in FIGS. 3, 4, and 5 may be used in conjunction with the biomass gasifier 28 having no fixed catalyst beds, a single fixed catalyst bed, or multiple fixed catalyst beds to recycle active catalyst and to generate producer gas with reduced tar levels. Furthermore, the controller 110 described with respect to FIG. 2 may be used in conjunction with any of the presently contemplated embodiments to facilitate the operation of any of the disclosed systems. For example, the controller 110, in addition to or in lieu of controlling various operational parameters of the biomass gasifier 28, may control the operation of various additive recycle features to automate certain operations, such as the feedstock preparation system 20 of FIGS. 1 to 5, the cyclone 130 of FIG. 3, the separation vessel 140 and heating unit 152 of FIG. 4, and/or the electrostatic separation vessel 160 of FIG. 5. Indeed, the present disclosure is intended to cover all combinations of the embodiments disclosed herein.

As described above, the disclosed embodiments provide systems for the treatment of producer gas within a biomass gasifier, for example to reduce the tar concentration of the producer gas. These systems may provide technical advantages over the use of cyclones, aqueous scrubbing units, and/or filters alone for the purification of producer gas. For example, the systems may allow tar contained within a gas mixture to be cracked within a gasifier, which also enables the cracked molecules to be gasified substantially immediately. Such immediate gasification may increase plant efficiency compared to downstream cracking systems, such as those that use tar cracking units disposed downstream of the gasifier. In such downstream cracking systems, additional piping and conduits may be required to transport the cracked molecules back to the gasifier. Therefore, the present embodiments avoid such additional equipment, which can reduce the costs associated with the construction and operation of biomass gasification facilities. Accordingly, the embodiments disclosed above may afford certain technical advantages such as increased throughput, increased plant efficiency, and/or producer gas having lower tar concentrations, among others, over existing systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A biomass gasification system, comprising:
   a feedstock preparation system configured to generate a biomass feedstock comprising a biomass fuel and a tar cracking additive;
   a gasifier fluidly coupled to and downstream of the feedstock preparation system, wherein the gasifier is a downdraft gasifier and is configured to gasify the biomass fuel in the presence of the tar cracking additive to generate first and second mixtures, wherein the first mixture comprises producer gas and a first portion of the tar cracking additive, and the second mixture comprises a second portion of the tar cracking additive and ash, and wherein the gasifier comprises:
      an open air inlet disposed at a top portion of the gasifier and fluidly coupled to the feedstock preparation system such that the gasifier receives the biomass feedstock from the feedstock preparation system;
      an updraft section disposed at a bottom portion of the gasifier, the updraft section is offset from a centerline axis of the gasifier and is configured to receive the first mixture; and
      a first gasifier outlet disposed within the updraft section such that a first flow direction of the first mixture exiting the gasifier outlet is substantially opposite a second flow direction of the biomass feedstock entering the gasifier; and
   an additive recycle system fluidly coupled to a second gasifier outlet and an inlet of the feedstock preparation system, the second gasifier outlet is aligned with the centerline axis of the gasifier, wherein the additive recycle system is configured to generate a recycled additive feed, and wherein the recycled additive feed comprises the first portion of the tar cracking additive, or the second portion of the tar cracking additive, or a combination thereof, and wherein the additive recycle system directs the recycled additive feed to the inlet of the feedstock preparation system.

2. The system of claim 1, wherein the additive recycle system comprises a separation unit configured to receive the second mixture from the gasifier and to separate the second portion of the tar cracking additive from the ash.

3. The system of claim 1, wherein the additive recycle system comprises a separation unit configured to receive the first mixture from the gasifier and to separate the first portion of the tar cracking additive from the producer gas.

4. The system of claim 1, wherein the additive recycle system comprises a charged vessel configured to receive the first mixture from the gasifier and to separate the first portion of the tar cracking additive from the producer gas based on charge.

5. The system of claim 1, wherein the feedstock preparation system is configured to direct the recycled additive feed and the biomass feedstock into the gasifier through the gasifier inlet.

6. The system of claim 1, wherein the feedstock preparation system is configured to direct the recycled additive feed into injectors configured to direct air into a reaction zone of the gasifier.

7. The system of claim 4, wherein the charged vessel is fluidly coupled to a cyclone configured to receive the producer gas.

8. The system of claim 1, wherein the gasifier inlet is aligned with a centerline axis of the gasifier.

9. The system of claim 1, wherein a flow path of the second mixture exiting the gasifier is in the second flow direction.

\* \* \* \* \*